United States Patent
Mizrahi

[11] 3,716,944
[45] Feb. 20, 1973

[54] NOISE MAKER

[76] Inventor: Albert H. Mizrahi, 532 Page St., Stoughton, Mass. 02072

[22] Filed: April 12, 1972

[21] Appl. No.: 243,278

[52] U.S. Cl. ................................................ 46/175
[51] Int. Cl. ........................................... A63h 5/00
[58] Field of Search ...................... 46/112, 175, 171

[56] References Cited

UNITED STATES PATENTS

| | | | |
|---|---|---|---|
| 2,367,430 | 1/1945 | Redlund | 46/175 R |
| 2,719,385 | 10/1955 | Wilson | 46/175 R |
| 3,131,507 | 5/1964 | Richter | 46/175 R |

Primary Examiner—Louis G. Mancene
Assistant Examiner—Robert F. Cutting
Attorney—Harold E. Cole

[57] ABSTRACT

A noise maker has a chamber with a cover that has a projecting striker of resilient material that normally is positioned in the path of the spokes of a bicycle wheel thus making a noise when the spokes contact it. Disconnect mechanism connects with a handle bar, and connecting means operably connects said chamber with said mechanism. Said mechanism has a rotatable sleeve that rotatably extends over the handle bar and rotatably connects with clamping members that are fixed to said handle bar. A hand grip outside of and fixed to said sleeve actuates the latter thus transferring the motion through said connecting means to the chamber and its striker to thereby move the striker into or out of normal position as desired.

13 Claims, 7 Drawing Figures

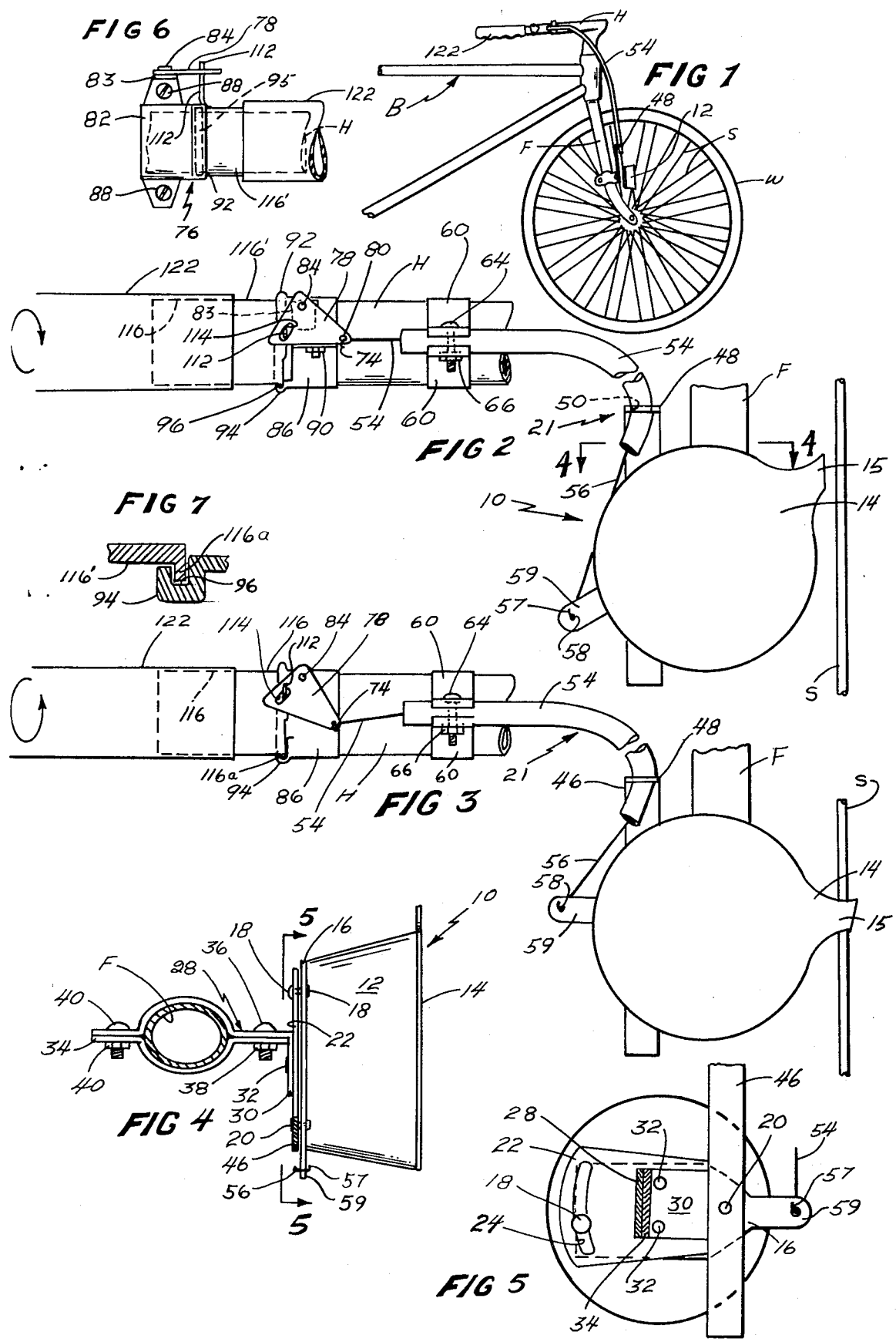

NOISE MAKER

Reference is made to my pending patent application, Ser. No. 37,219, filed May 14, 1970 for a Noise Making Device For A Bicycle, in Group No. 333.

The principal object of my invention is to provide a noise maker that can be operably connected to the front wheel of a bicycle, so constructed that it operates simply and can be manufactured at a relatively low cost in labor and materials. A further object is to make its attaching means so simple that a young boy can connect it to his bicycle.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and therefore, we are not to be limited to the construction disclosed by the drawing, nor to the particular parts described in the specification; but am entitled to all such changes therefrom as fall within the scope of our invention. In the drawing:

FIG. 1 is a side elevational view showing my noise maker attached to a front fork of a bicycle, the frame of the latter being shown broken away.

FIG. 2 is a side elevational view of my noise maker in inoperative position, showing the striker on a clapper spaced from a bicycle spoke.

FIG. 3 is a side elevational view similar to FIG. 2; but showing the striker extending into the path of rotation of a bicycle spoke.

FIG. 4 is a top plan view showing my noise maker attached to the fork of a bicycle, the latter being shown in section.

FIG. 5 is a sectional view taken on the line 5—5 of FIG. 4.

FIG. 6 is a side elevational view on a reduced scale, showing the disconnect means of my noise maker mounted on a handle bar.

FIG. 7 is an enlarged, fragmentary, cross-sectional view showing a guide tab of an actuating sleeve extending into the channel of a channel member.

As illustrated, noise making means 10 has a cup or chamber 12, preferably made of a plastic, such as linear polyethylene, and which has a clapper 14 that covers the opening thereof and extends beyond to provide a striker 15. Said clapper 14 is preferably made of a durable resilient plastic such as one known as "Mylar" in the trade. Slide 16 is fixed to the solid end of said chamber 12 by a pin or rivet 18 that serves as a guide in a slot 24 later referred to.

Another rivet 20 fixes said slide 16 to said chamber 12, and it also extends through a base plate 22; having a slot 24, and through a link 46 later referred to. Said rivet 18 slides along said slot 24 when said clapper and striker are moved into or out of engagement with the spokes of a bicycle wheel W. Screws 36 and 40 pass through another bracket 34 and through said bracket 28. Nuts 38 and 42 connect respectively with said screws 36 and 40, thus holding the latter brackets firmly around the fork F of a bicycle B.

Connecting means 21 is connected to said noise making means 10 and to disconnect means 76 later referred to. Said means 21 has a link 46 that is outside of and connected to said attaching slide 16 and base plate 22 by said rivet 20. Said link 46 lies against the edge of said bracket angle portion 30, and it has an angular attaching member 48 with a hole 50 therethrough later referred to. An elongate, flexible sheath such as a tube 54, which may be made of plastic such as linear, polyethylene, extends tightly through such hole 50. An actuating rod such as metal wire 56, which is relatively rigid, loosely extends through said tube 54 and beyond. It is sufficiently flexible to bend with said tube, but remains stable when outside of the latter. Said wire 56 has a bent end 57 that extends through a hole 58 in a projecting portion 59 on slide 16.

At another end of said tube 54 are two brackets 60 which are held to said tube by bolts 64 and nuts 66. An angular end 74 of said wire 56 extends to disconnect means 76 and enters a hole 80 in a cam 78 that is connected to an arcuate clamp 82 having an angular end member 83 through which a rivet 84 passes to rotatably connect said cam 78 to said clamp 82. Another arcuate clamp 86 is attached to said clamp 82 by bolts 88 and nuts 90 whereby said clamps 82 and 86 firmly extend around a bicycle handle bar B to thereby movably mount said disconnect means 76 on said handle bar.

Extending peripherally outward from and integral with said clamp 82 is an arcuate channel member 92, and spaced arcuately from the latter is another similar arcuate channel member 94, which latter members provide channels 95 and 96 respectively, later referred to. A rotatable, actuating sleeve rotatably extends over a handle bar H, being tightly covered by a handle grip 122, later referred to, except there is an uncovered inner end 116' thereof. Guide tabs 116a extend integrally from said sleeve 116 peripherally outward and are freely movable in said channels 95 and 96 when said sleeve 116 is rotated, as in a disconnect movement. Said tabs 116a are space apart, and they keep the sleeve 116 movably connected with said fixed clamps 82 and 86.

An actuating finger 112 extends angularly from said sleeve 116 and movably extends into said slot 114 in said cam 78. Rotatable movement of said grip 122 and thus of said disconnector sleeve 116 moves said finger 112 against the said cam 78 at said slot 114, thus causing rotation of said cam 78. This actuates said end 74 of wire 56 thus rotatably moving said chamber 12 and slide 16. This carries said striker 15 respectively into the path of the spokes S of a wheel W, or out of said path, depending upon which direction said sleeve 116 is rotated.

What I claim is:

1. A noise maker for a bicycle comprising noise making means having a chamber, a cover therefor embodying a resilient striker extending beyond the periphery of said cover, a slide fixed to said chamber, a base plate connected to said slide, the latter being slidable on said base plate, said slide being adapted, upon actuation, to move said striker respectively into and out of the path of the rotating spokes of a bicycle when said chamber is in position of use.

2. A noise maker as of claim 1, said base plate having a slot therethrough, a pin member extending from said chamber into said slot and slidable therein.

3. A noise maker as of claim 1, and attaching means fixed to said base plate and adapted to be attached to a bicycle.

4. A noise maker as of claim 1, and disconnect means, and connecting means operably connecting said noise making means to said disconnect means, said connecting means, having a wire attached to said slide and to said disconnect means whereby actuation of the latter moves said wire and said slide whereby said striker is moved respectively into and out of said path.

5. A noise maker as of claim 4, said connecting means having a sheath attached to said disconnect means, said wire movably extending through said sheath and beyond at opposite ends thereof.

6. A noise maker as of claim 5, said connecting means having a link connected to said base plate and to said sheath.

7. A noise maker as of claim 4, said disconnect means having an actuating sleeve adapted to be movably attached to a handle.

8. A noise maker as of claim 7, said disconnect means having a rotatable cam having an opening therethrough, said sleeve having an actuating finger movably extending into said opening and adapted to move and bear against and rotate said cam when said sleeve is actuated, said wire being attached to said cam whereby it is moved upon actuation of said finger against said cam.

9. A noise maker as of claim 8, said disconnect means having clamp means adapted to be fixedly attached to a bicycle handle bar, and having channel means extending towards said sleeve, said cam being rotatably connected to said clamp means, said sleeve having guide tabs extending peripherally outward and movably into said channel means whereby said tabs keep said sleeve operably connected to said channel means.

10. A noise maker as of claim 9, said channel means having two members spaced arcuately apart and extending peripherally farther outward than adjoining portions of said clamp means.

11. A noise maker as of claim 7, in combination with a bicycle having a handle bar and a hollow grip extending over a portion of the latter, said sleeve extending into said grip and being fixed thereto whereby rotation of said grip rotates said sleeve.

12. A noise maker as of claim 11, said disconnect means having two clamp members that extend partly around said handle bar, means attaching said clamp members together and to said handle bar, one of said clamp members having an angular end member, said cam being rotatably connected to said end member.

13. A noise maker as of claim 3 in combination with a bicycle having a front fork and a front wheel with spokes, said attaching means being fastened to said fork, said striker normally extending into the path of said spokes when said front wheel is rotated.

* * * * *